Aug. 21, 1962   H. L. HALL   3,050,298
CALCINATION MEANS AND METHOD
Filed April 4, 1960   4 Sheets-Sheet 1

INVENTOR
HUBERT LIONEL HALL
BY
ATTORNEY

Aug. 21, 1962     H. L. HALL     3,050,298
CALCINATION MEANS AND METHOD

Filed April 4, 1960     4 Sheets-Sheet 2

INVENTOR
HUBERT LIONEL HALL
BY Henry L. Shevier
ATTORNEY

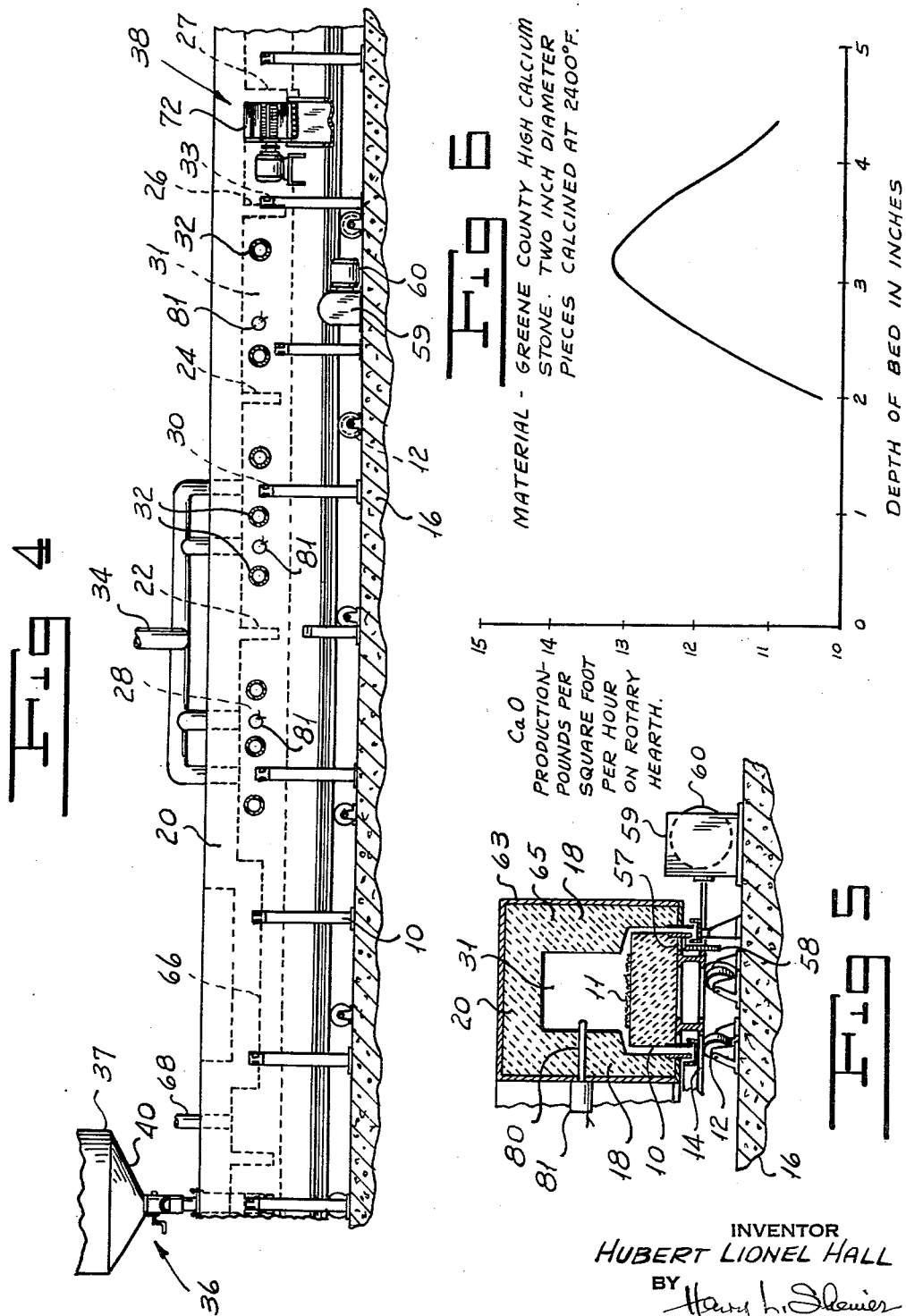

Aug. 21, 1962  H. L. HALL  3,050,298
CALCINATION MEANS AND METHOD
Filed April 4, 1960  4 Sheets-Sheet 4
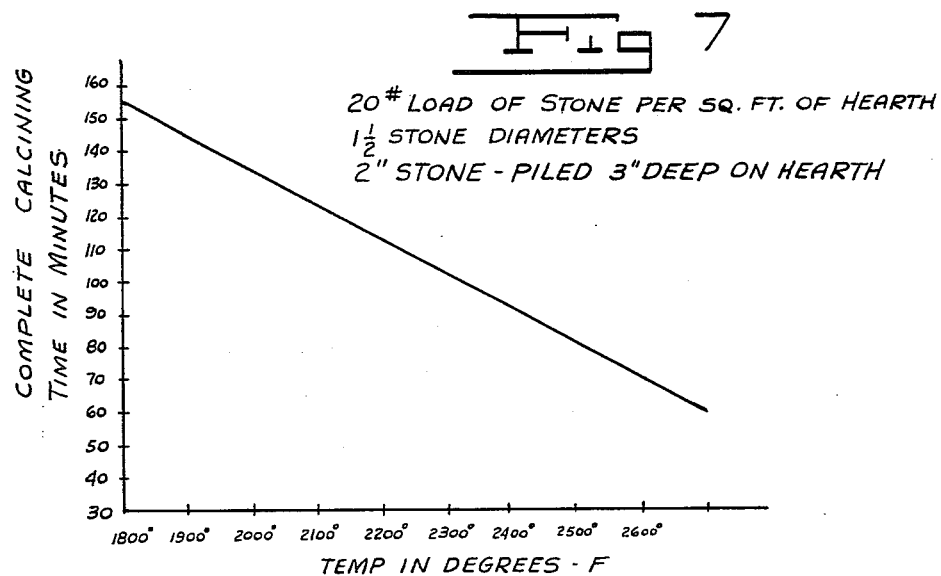
Fig 7
20# LOAD OF STONE PER SQ. FT. OF HEARTH
1½ STONE DIAMETERS
2" STONE - PILED 3" DEEP ON HEARTH
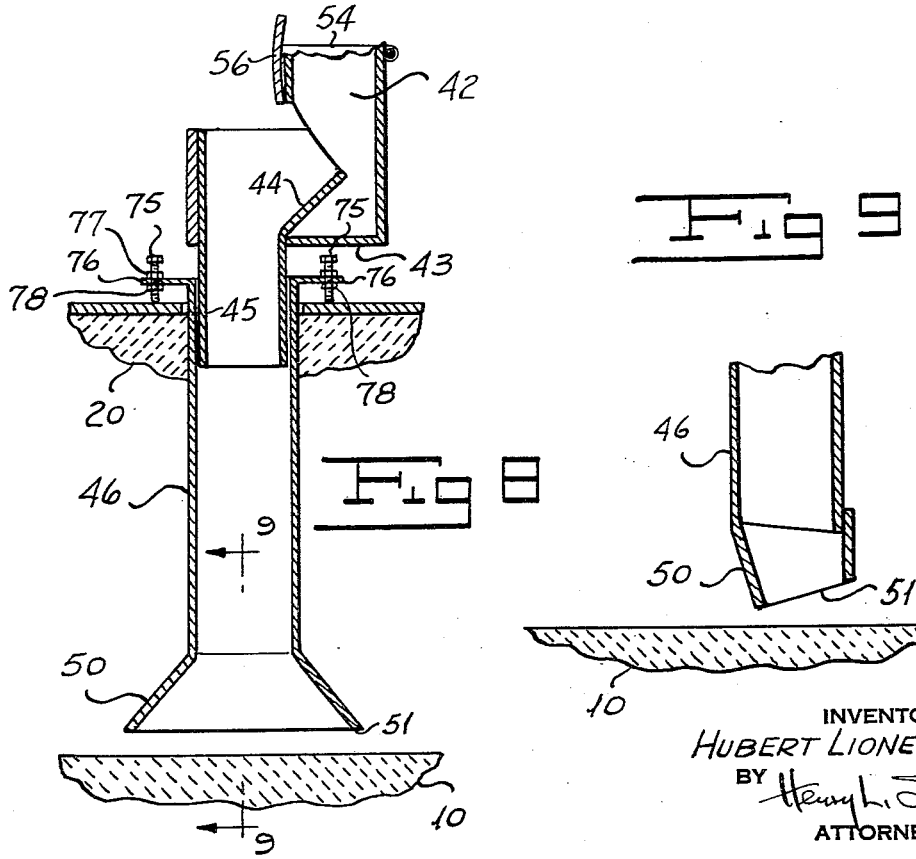
INVENTOR
HUBERT LIONEL HALL
BY
ATTORNEY 3,050,298
CALCINATION MEANS AND METHOD
Hubert Lionel Hall, Weston, Ontario, Canada, assignor to Richard Terry Hall, Toronto, Ontario, Canada
Filed Apr. 4, 1960, Ser. No. 19,618
5 Claims. (Cl. 263—28)

My invention relates to a method and apparatus for calcining limestone to produce lime and more particularly to an improved process and apparatus of calcining limestone to produce an increased yield of lime for the available hearth area.

In calcining limestone it is converted into lime (CaO) by heating the limestone (CaCO$_3$) to a temperature of at least 1600° F., to disassociate the CO$_2$ therefrom, leaving the desired CaO.

This application is a continuation-in-part of my copending application, Serial Number 665,845, filed June 14, 1957, now abandoned.

Known procedures for calcining limestone are based on the use of either vertical kilns or the use of horizontal rotary kilns.

In using vertical kilns, limestone is fed into the top of a vertically disposed refractory-lined shaft of substantial height. The shaft of the kiln may have various cross-sectional shapes as desired. As the limestone is calcined, by virtue of combustion attained through the use of gas or other suitable fuel, the limestone travels downwardly through the shaft, passing successively through a storage zone, a preheating zone, a burning zone, and finally through a cooling zone. The lime produced may be drawn off from the bottom of the shaft in a continuous or in an intermittent manner.

With calcination in a vertical kiln, the limestone moving down the shaft is subject to rubbing action relative to the boundary walls of the shaft and inter-rubbing contact between adjacent pieces of limestone being processed. Then too, the pressure at successively lower points in the shaft increases owing to the weight of the material above.

The combination of pressure and friction, as described, produces fines in substantial amounts. As gases of combustion and dissociation travel upwardly through the shaft, the fines become irregularly dispersed between the larger pieces of material and create unevenly distributed gas channels. Such phenomena, known as "channeling" causes uneven distribution of the hot gases in respect of the limestone being calcined. Uneven heat distribution in turn is responsible for conditions which cause the kiln to "bridge" and "hang" either completely or partially. As a result of the foregoing conditions, the column of limestone will move downwardly in an uneven fashion, causing some pieces to pass through the burning zone faster than others. There is thus produced a calcined product which is of non-uniform character in that portions thereof are either overburned or under calcined.

Because of the problems outlined above, arising from channelling, excessive production of fines, uneven fuel and air distribution, and because of mechanical requirements, vertical kilns are usually confined to calcination of limestone in large sizes.

In the horizontal rotary kiln, limestone is fed into one end of an elongated refractory lined tube which revolves continuously around its longitudinal axis which axis is tilted at a slight angle with respect of the horizontal. The tube is heated by gases. As the inclined tube rotates, the limestone is calcined and moves in a progressive manner to discharge at the lower outlet end of the tube.

A burning zone is arranged at the discharge end of the tube and combustion gases pass up the tube toward its charging end and thus approximate in their travel the burning and preheating zones found in the vertical kiln.

In the horizontal kiln, the limestone is also subject to rubbing action as between the stones themselves and the stones in abrasive contact with the walls of the kiln. Unless the stone supplied to the kiln has substantial resistance to abrasion and breakage, attrition will reach such proportions as to seriously lower the output of lime of desired size.

Besides the attrition mentioned above, it is found (1) that large stones proceed through the shaft faster than the small stones and also (2) that the small stones travel below the large and thus tend to be blanketed by the large pieces in the tube so that for both of these reasons, uneven burning occurs due to the varying effects of these factors, causing a product which is non-uniformly calcined.

In both the prior processes it has been found that inspection of partially processed material is practically impossible and hence the warning of improper conditions given to the operator by the discharge of improper calcined material arrives too late to save the batch of material at that moment in the kiln.

It has been suggested by the prior art to calcine limestone by placing the limestone to be calcined in carriages supported by trucks and moving the trucks through a tunnel kiln. Attempts to practice this method, however, have been unsuccessful owing to the fact that the upper layer of the limestone tended to be overburned while the bottom layer of limestone which was blanketed by the upper pieces of stone tended to be underburned. Overburning ruins the lime and underburning results in the production of hard cores of the original stone owing to the fact that the conversion appears to take place in coatings from the outside toward the center.

I have found that production of uniformly calcined limestone may be attained at a maximum rate of production by depositing the raw limestone on a hearth at a regulated uniform depth which is critically correlated to the average size of the stones deposited. Hence a smaller sized kiln may be employed to achieve a desired rate of production of lime.

One object of my invention is to provide a limestone calcining apparatus in which the limestone pieces are fed to a moving hearth in a manner to leave the pieces stationary on the hearth while they are subjected to heat to effect calcination; the pieces being substantially free from conditions of pressure or relative movement whereby practically to avoid the production of fines and the resultant disadvantages thereof.

Another object of my invention is to provide a process of calcining limestone while the stones are stationary relative to each other and relative to a hearth in which an increased yield of lime is obtained with respect to the hearth area.

Another object of my invention is to provide a calcining apparatus in which the limestone is supplied to a hearth surface by a conduit or hopper having outlet means which may be adjusted to regulate the spacing between the outlet means and the hearth surface, and thereby control the depth of the limestone deposited on the hearth surface.

A further object of my invention is to provide limestone calcining apparatus which comprises a rotary hearth, and means for forming successive chambers relative to said hearth to provide in succession, loading, preheating, burning and cooling zones, together with heating means in the form of burning gases which travel countercurrent to the travel of the limestone under conditions to provide optimum use of the heat content of the gases in respect of the successive chambers; together with means for quickly adjusting the temperature in the several chambers for optimum heating conditions in the several chambers.

An additional object of my invention is to provide apparatus for calcining limestone in which the hot gases used to burn the limestone are also used to preheat the limestone in the supply hopper or conduit as the charge is being delivered to the hearth, the movement of such perheating gases being such as to reduce the pressure within the heating and burning chambers and thereby materially reduce the gas leakage through the walls of the kiln, thereby retarding deterioration of the walls.

Other and further objects of my invention will appear from the following description.

In general my invention contemplates provision of a method and apparatus for calcining limestone wherein a moving hearth preferably having a horizontal surface is enclosed by refractory walls to provide a space therebetween for the deposit of raw limestone for the provision of a path for the calcining combustible gases, together with means for regulating the depth of the deposited stones on the hearth in predetermined relation to their average size to provide a maximum rate of calcination. Provision is made for forming successive chambers corresponding to preheating, burning and cooling zones with means for controlling the temperatures in these zones. I provide means for regulating the pressure within these zones and for concomitantly preheating the limestone supplied to the hearth.

In the accompanying drawings which form part of the instant specification and which are to be read in conjunction therewith and in which the like reference numerals are used to indicate like parts in the various views, FIGURE 1 is a perspective view of my calcining apparatus with parts broken away and parts in section;

FIGURE 4 is a side view development obtained by removing the outside space defining wall and illustrating what would be seen by proceeding around the chamber and looking inward.

FIGURE 5 is a sectional view taken on the line 5—5 of FIGURE 2;

FIGURE 6 is a curve of yield of lime plotted against bed depth showing the relationship of the depth of the limestones of a given size on the hearth to the rate of production of lime;

FIGURE 7 is a curve showing the relationship of calcining temperature with respect of time for completing calcination, for a given size of limestones deposited at an optimum depth as shown in FIGURE 6 on the hearth;

FIGURE 8 is an enlarged fragmentary sectional view showing the adjustable outlet for the feed stack supplying limestone to the hearth;

FIGURE 9 is a vertical section taken on the line 9—9 of FIGURE 8.

Figure 3:
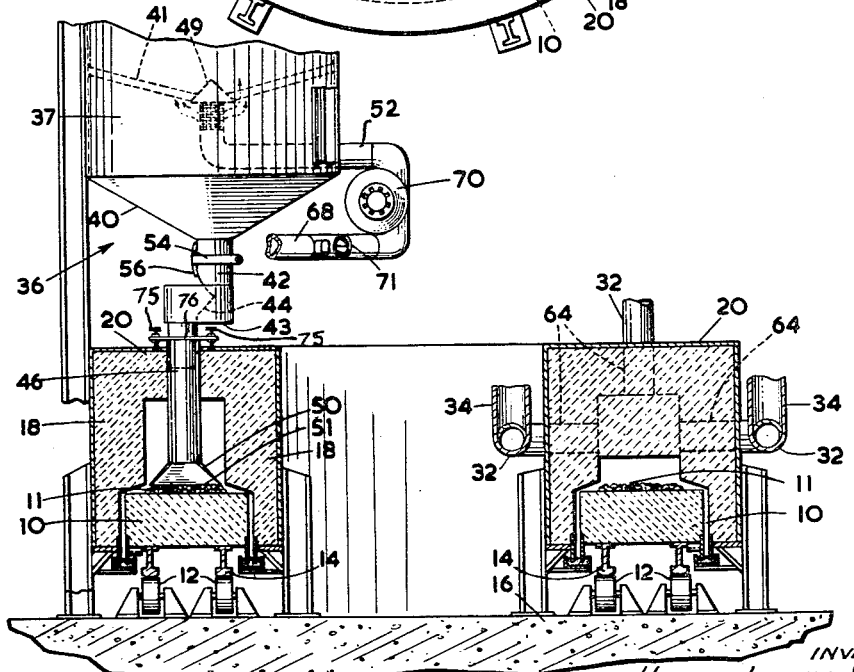
FIGURE 3 is a vertical sectional view taken on the line 3—3 of FIGURE 2.

More particularly referring now to the drawings, my apparatus for calcining limestone comprises an annular hearth or platform 10 arranged for circular movement on a supporting base 16 by means of circular rails 14 affixed to the underside of said hearth. The rails move on wheels 12 arranged in a circle on base 16. The wheels are journalled on supporting brackets for rotation about horizontal axes, as shown in FIG. 3.

Figure 1:
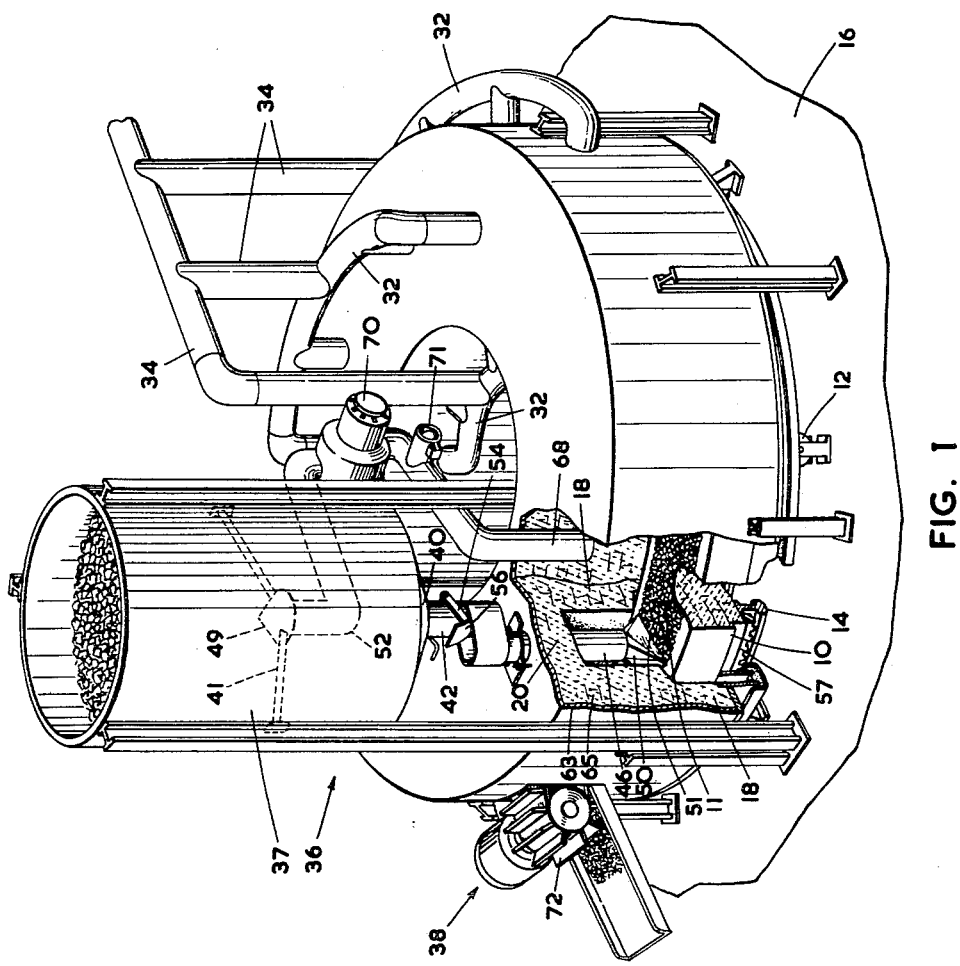
Figure 2:
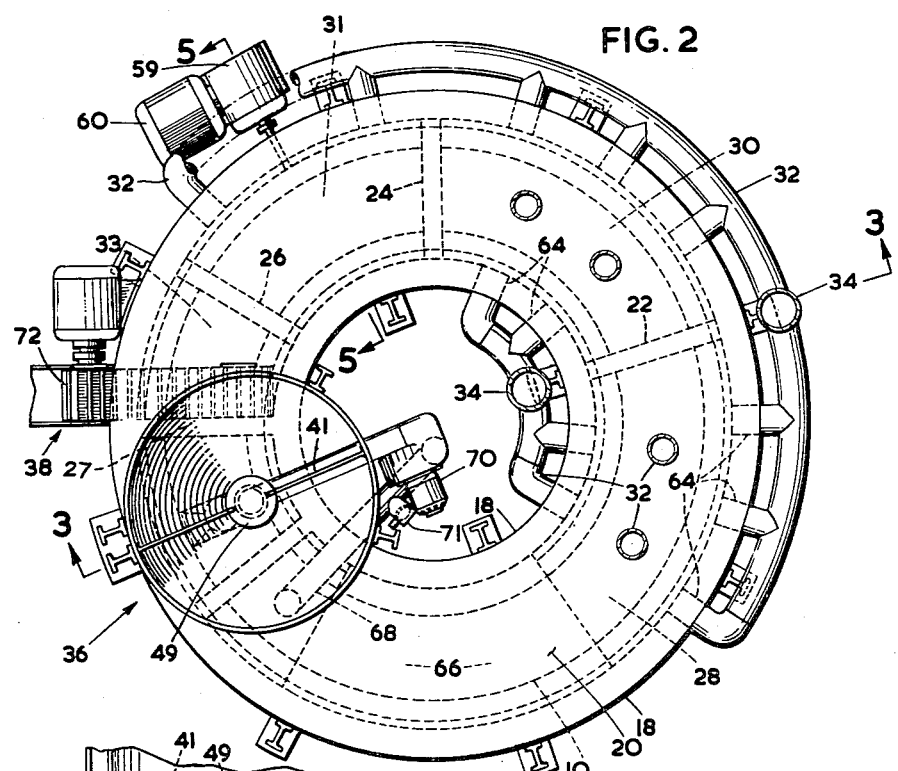
FIGURE 2 is a top plan view of the kiln shown in FIGURE 1.

Hearth 10 is enclosed by a stationary annular refractory structure which rises from base 16, and comprises opposed side walls 18 joined at their upper ends by a roof 20. The walls 18 and the roof 20 define an annular space immediately above the top surface of hearth 10. As shown in FIGS. 2 and 4, a series of spaced baffles 22, 24, 26 and 27 depend from roof 20 to provide a series of successive chambers 28, 30, 31 and 33 in said annular space.

Chambers 28, 30 and 31 are heated to temperatures of from 1600° F. to 2800° F. by combustion of fuel such as gas, oil or the like supplied through pipes 32 and 34. Baffles 22, 24, 26 and 27 extend downwardly from roof 20 to a point adjacent the top surface of hearth 10, as can be seen in FIG. 4, to provide sufficient space to allow hot gases of combustion to flow through the several chambers.

A charging assembly indicated generally by the reference numeral 36 is provided for supplying limestone to be calcined, to hearth 10. A lime removal assembly 38 is provided for removing the calcined material. Charger 36 comprises a vertically disposed hopper 37 open at its upper end to receive the raw limestone in substantially uniformly graded sizes. A funnel shaped wall 40 extends from the lower end of hopper 37 and a conduit 42 depends from funnel shaped wall 40.

It has been discovered by repeated tests that the rate of calcination of limestone at a given average size is optimum, when the stone is deposited on the hearth to a predetermined, uniform depth which is a function of average stone diameter. Thus, as indicated in the curve shown in FIG. 6, when Greene County, Missouri, high calcium stone averaging about 2" in diameter was calcined at about 2400° F., a maximum rate of uniform calcination took place when the deposited bed of stone had a depth of about 3". Upon using stones of various average diameters I have discovered that to attain a maximum rate of calcination in respect of hearth area the depth of the bed should be about 1.5 times the average diameter of the raw limestone pieces.

Accordingly, I provided means for regulating the depth of the stone deposited from hopper 40 on hearth 10. To this end, as shown in FIGS. 3, 8 and 9 an outlet member 46 is located in offset communicating relation to conduit 42. The member 46 terminates at its lower end in a flared mouth 50 disposed immediately above hearth 10. The upper end of conduit 46 passes freely through an opening in roof 20 and is in telescopable, movable relation to the lower end of a short conduit section 45, which in turn extends through a bottom wall 43 which closes the lower end of conduit 42.

Conduit section 45 includes an inclined wall 44 which extends upwardly into the lower end of conduit 42. Conduit section 46 is arranged for vertical movement toward and away from hearth 10 by means of bolts 75 extending through a flange 76 at the upper end of section 46. The studs 75 bear on the top outer surface of roof 20. Lock nuts 77, 78 on studs 75 hold conduit 46 in selected vertical positions to locate outlet edge 51 in desired spaced position relative to hearth 10.

A pair of arms 54 are pivoted on the conduit 42, at a point above conduit 46, to support a curved closure plate 56 for closing the lower open end of conduit 42, to stop the flow of limestone into conduit 46 when desired. Plate 56 may be moved upwardly by way of arms 54 and retained in a raised position by suitable means, not shown, to allow normal flow of material to hearth 10.

It will be apparent that the offset relation of conduits 42, 46 allows the limestone supplied to hearth 10 to form a relatively short column in short conduit section 46, thereby reducing the pressure on the stone being deposited directly on said hearth, inasmuch as the wall 43 of conduit 42 bears the major weight of the column material in conduit 42 and in hopper 37.

It will be apparent that adjustment of conduit 46 by means of studs 75 and nuts 77, 78, will locate edge 51 of discharge nozzle 50 to regulate the depth of the bed of limestone deposited on hearth 10. Thus, as indicated in FIG. 6, such bed at a depth of 3" for stone having an average diameter of 2", produced lime at a maximum rate. It is understood that for stones having other average diameters or transverse dimensions the depth is adjusted to about 1.5 times such average dimensions.

The hearth 10 is caused to rotate on wheels 12 by means of an annular rack 57 secured to the underside thereof and engaged by gear 58 which is rotated by a power source 60 connected through a variable speed device 59. It is understood that rails 14 and wheels 12 may be reversed in relation to hearth 10 and base 12.

Fuel such as gas supplied through pipes 34 and 32 burns in chambers 28, 30 and 31 to heat the limestone and to calcine it on hearth 10. The burning gases move countercurrent to the movement of the limestone with hearth 10, whereby in addition to acting as a calcining agent the gases of progressively less heat content continue in a path toward stack 36 to preheat the freshly deposited limestone.

The fuel is supplied to burners (not shown) in chambers through side and overhead ports 64 from lines 32, 34 and is adapted to produce chamber temperatures of from about 1600° F. to about 2800° F. Such fuel may be typically either in gaseous or atomized liquid form. The minimum dissociation temperature for limestone is approximately 1600° F.

Accordingly, to insure maximum utility of the fuel, the chamber walls 18, 20 are preferably formed of steel 63 lined with refractory material 65. The interior surfaces of walls 18 and 20 act as radiant sources for the heat incident to combustion of the fuel in chambers 28, 30 and 31. Further, convection owing to the restricted space between hearth 10 and walls 18, 20, as well as the conduction of said walls, augment the transfer of heat to the limestone being calcined. In addition, the limestone in heated condition becomes a secondary source of heat transfer by radiation.

The combustion of the fuel in the several chambers 28, 30, 31 is regulated by baffles 22, 24, 26 and 27. The limited space between the bottom edge of each baffle and the opposed hearth 30 will control gas flow and is effective to ensure sufficient gas velocity to create a condition of turbulence, which induces circulation of the gases in the chambers 28, 30 and 31 to augment convection heating of the limestone.

By use of a plurality of combustion chambers, each of which may be provided with a thermocouple 80 connected to suitable actuating means 81 for regulating the fuel supply or the like through suitable valves or the like (not shown) and thereby closely regulating the temperature in each of said chambers, the calcining process may be closely regulated in its successive stages to insure the production of a uniformly burned product, substantially free of underburned or over calcined stone.

Chamber 28 may function as both a calciner and as a preheater so that one portion of the material may be calcined at about 1600° F. while another portion thereof is brought to calcining temperature. Thus the temperature of said chamber 28 may range from about 1600° F. to about 2500° F., avoiding the necessity for using the maximum temperature of 2800° F. The movement of the hearth 10 is regulated to ensure complete calcination as the material passes through the successive combustion zones or chambers with proper dissociation, all in a minimum time. It will be apparent that much useful heat in chambers 30, 31 will be derived by way of radiation from the walls of said chambers as well as from the hot combustion products.

The gases moving countercurrent to the movement of the limestone for calcining the same may also be used to preheat the limestone as it is supplied to the hearth. To insure optimum contact of the gases of reduced heat content with the limestone, the preheating of the limestone may take place in a portion of chamber 28 defined by a depending ceiling 66 to provide a constricted space such as formed by baffle 22 as shown in FIG. 4. This arrangement ensures maximum transfer of heat to the limestone by way of convection and conduction from the hot combustion gases.

Gases passing out of the preheat area toward stack 37 can be further used to preheat material in the stack. To this end, gases from the preheat zone are passed upwardly by way of conduit 68. A suction fan 70 moves the gases and introduces them into the lower portion of hopper 37 by means of a conduit 52 which is provided at its open end with a protective hood 49 held in position by radial struts 41. The fan 70 is controlled to keep the gas flow at a desired velocity. To avoid damage to fan parts owing to heat, I temper the hot gases by cooling air admitted through a suitably controlled inlet 71. The tempered heated gases thus pass upwardly through the limestone in stack 37 and preheat the same.

The fan 70 is also effective to reduce the pressure in chambers 28, 30 and 31 somewhat below atmospheric pressure. This materially reduces outward leakage of gases through walls 18, 20. This reduction in gas leakage in turn retards the deterioration of walls 18, 20.

The means 38 for removing the calcined material is placed as close as possible to the supply means so that heat loss between the introduction of new limestone and the removal of calcined material is minimized. Baffle 27 separates the removal means 38 from the outlet 50 of stack 37 to prevent the loss of heat and pressure in the supply area. Baffle 27 terminates at a point very close to hearth 10 and below the level of limestone deposited on said hearth. The assembly 38 comprises a series of scrapers 72 travelling in a path transversely of the movement of hearth 10, to scrape the calcined limestone from said hearth to a suitable receptacle (not shown).

It will be understood that advantageously the pieces of limestone are roughly graded to substantially the same range of stone diameters. I use the term "diameter" throughout this specification as the average length of the lines through the center of the stones. It will be appreciated that such stones may be of irregular configuration. Ideally they should be spheres and in such case the optimum thickness of the layer deposited in the hearth would be 1.5 times the stone diameter. In practice an ideal situation cannot be achieved but advantageous results will be obtained if the thickness of the layer of stone upon the hearth is 1.5 times the average stone diameter. If the bed thickness varies materially from the optimum dimension the production of lime per square foot per hour on the rotary hearth will materially decrease. This is shown clearly in FIG. 6.

It will be seen that I have accomplished the objects of my invention. I have provided a limestone calcinating apparatus in which the limestone pieces are fed into a moving hearth in a manner to leave pieces stationary on the hearth while they are subjected to heat to effect calcination. During calcination the pieces will be thus freed from conditions of pressure and abrasive relative movement between stones. I have provided a process of calcining limestone which produces an increased yield of lime for a unit of hearth area within a given time period and thus get a greater production from equipment of lesser size and with a smaller capital investment. This results in reduced costs of production owing to the decreased capital investment required and decreased maintenance costs of the equipment. In my apparatus I am readily enabled to control the depth of the bed by controlling the outlet nozzle of the charging equipment to the hearth. I provide successive zones for loading, preheating and burning the limestone which successive zones are maintained at progressively increasing temperature. In my apparatus and process the burning gases travel countercurrent to the travel of the limestone thus producing optimum use of heat.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A process of calcining limestone including the steps of depositing substantially uniformly graded pieces of limestone upon a hearth, controlling the depth of the deposited material to approximately one and a half times the average limestone piece diameter, heating the depositted stone to a temperature of between 1600° F. and 2800° F. and then removing the calcined material from the hearth.

2. A continuous process for calcining limestone pieces including the steps of depositing pieces of limestone to be calcined upon a moving hearth, controlling the deposit so that the depth of the bed of limestone pieces upon the hearth is one and a half times the average piece diameter, heating the limestone to a temperature between 1600° F. and 2800° F. and then removing the lime from the hearth.

3. A continuous process for calcining limestone pieces including the steps of depositing pieces of limestone to be calcined upon a moving hearth, controlling the deposit so that the depth of the bed of limestone pieces upon the hearth is one and a half times the average piece diameter, heating the limestone to a temperature between 1600° F. and 2800° F. for a period between about an hour and about three hours and then removing the lime from the hearth.

4. A continuous process of calcining limestone to form lime including the steps of continuously depositing substantially uniformly graded pieces of limestone upon a moving hearth, controlling the deposit to provide a bed of pieces of limestone upon the hearth of about a thickness of substantially one and a half times the average limestone piece diameter, establishing a plurality of heating zones of successively decreasing temperatures between 2800° F. and 1600° F. and moving the hearth through said zones in a period between one and three hours while continuously removing the lime from said hearth.

5. Apparatus for calcining limestone pieces including in combination a rotary horizontal refractory hearth, an annular kiln enclosing said hearth, a feeding hopper for charging limestone pieces to said hearth, said feeding hopper including a vertical conduit having upper and lower portions in offset communicating relationship with each other, the upper portion having a bottom wall for supporting the column of pieces in said upper portion the lower portion terminating at its lower end in a nozzle positioned adjacent the top surface of said hearth and means for adjusting the separation of said nozzle from said hearth.

References Cited in the file of this patent

UNITED STATES PATENTS

| | | |
|---|---|---|
| 1,621,222 | Robertson | Mar. 15, 1927 |
| 2,039,833 | Payne | May 15, 1936 |
| 2,283,758 | Pike | May 19, 1942 |
| 2,603,471 | McDonald | July 15, 1952 |
| 2,622,863 | Dauch | Dec. 23, 1952 |
| 2,767,972 | Badger | Oct. 23, 1956 |
| 2,776,828 | Marcellus et al. | Jan. 8, 1957 |
| 2,939,695 | Gates | June 7, 1960 |

FOREIGN PATENTS

| | | |
|---|---|---|
| 271,707 | Great Britain | June 2, 1927 |
| 639,666 | Great Britain | July 5, 1950 |